United States Patent
Juergen et al.

(10) Patent No.: US 7,209,625 B2
(45) Date of Patent: Apr. 24, 2007

(54) METHOD AND DEVICE FOR CLEANING AN OPTICAL WAVEGUIDE REMOVED FROM ITS JACKET

(75) Inventors: Islinger Juergen, Duernhausen (DE); Reinerth Fridtjof, Maisach (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/150,204

(22) Filed: Jun. 13, 2005

(65) Prior Publication Data

US 2005/0286852 A1    Dec. 29, 2005

(30) Foreign Application Priority Data

Jun. 29, 2004    (DE) .................... 10 2004 031 406

(51) Int. Cl.
*G02B 6/00* (2006.01)
*B08B 7/04* (2006.01)

(52) U.S. Cl. .................. 385/134; 385/147; 134/37

(58) Field of Classification Search ............... 385/134, 385/147; 134/34–37, 105, 198; 15/300.1, 15/302, 320, 345
See application file for complete search history.

(56) References Cited

U.S. PATENT DOCUMENTS 5,125,980 A * 6/1992 Schotter .................... 134/15
5,922,141 A * 7/1999 Darsey .................... 134/15

FOREIGN PATENT DOCUMENTS

EP         0483059 B1     8/1995
WO    WO02/44778 A1      6/2002

OTHER PUBLICATIONS

Derwent Abstract EP483059; Endoscope-cleaning machine tests peripheral chamber sealing and passage freedom and aids cleaning by pneumatic impulses.

* cited by examiner

*Primary Examiner*—Sarah Song

(57) ABSTRACT

The present invention is directed to a method for cleaning a section of an optical waveguide removed from its jacket, in which the optical waveguide section is inserted into a treatment cell, sprayed with a cleaning fluid, blasted with compressed air and removed from the treatment cell. The method allows cleaning in precisely defined conditions, which can be carried out in a simple fashion in a corresponding device. The blasting of the optical waveguide section with compressed air preferably first includes the use of heated compressed air and then the use of cold compressed air. The present invention is also directed to a cleaning device with a treatment cell to hold the optical waveguide section, the treatment cell having a first inlet for the supply of compressed air, a second inlet for the supply of cleaning fluid and an outlet for the removal of compressed air and cleaning fluid. The cleaning device is preferably configured as a system that is isolated from the environment, so that the escape of possibly toxic liquid or vaporous cleaning agents and therefore any danger to the health of an operator is reliably excluded.

16 Claims, 2 Drawing Sheets

METHOD AND DEVICE FOR CLEANING AN
OPTICAL WAVEGUIDE REMOVED FROM
ITS JACKET

BACKGROUND OF THE INVENTION

The invention relates to a method and a device for cleaning a section of an optical waveguide removed from its jacket, in particular in preparation for a splicing procedure, in which two ends of cleaned optical waveguide sections are welded thermally together.

In order to be able to connect together light-directing fibers, frequently also referred to as optical waveguides or optical fibers, the ends of the optical waveguides have to be welded thermally together. This procedure is also referred to as splicing. Splicing generally takes place in special splicing devices, with the two optical waveguides to be connected together being positioned in relation to each other before the actual splicing procedure such that their end surfaces face each other without any lateral displacement. The actual splicing procedure then takes place by drawing an electric arc between two electrodes arranged on opposing sides adjacent to the two end surfaces.

To obtain a good splice connection between two optical waveguides, i.e. a connection with little optical attenuation and a high level of mechanical tensile strength, the end sections of the optical waveguide have to be thoroughly prepared before the actual splicing procedure. This includes both very precise separation, to produce as flat an optical waveguide end surface as possible by means of a perpendicular, sharp-edged cut, and the cleaning of the optical waveguide end section removed from its jacket. Cleaning is necessary, as when removing the jacket, during which process the coating is generally removed from the optical waveguide by means of a suitable tool, residues of the jacket frequently remain on the removed optical fibers. These residues can impede subsequent welding of the optical waveguides. Therefore a high quality spliced connection requires a cleaning procedure during which all the coating residues are removed.

For optimum preparation for splicing, in addition to the above-mentioned precise separation and complete cleaning, it is also necessary to straighten the optical waveguide end sections. Straightening is necessary for precise positioning of the optical waveguide end sections during the splicing procedure. As the optical waveguide jacket is generally made of plastic and therefore frequently produces internal stresses, which result in distortion of the optical waveguide, it is necessary to reduce these internal stresses by heating the optical waveguide. The section of an optical waveguide, which is not removed from its jacket, can then be straightened. Such alignment for example is achieved by heating the optical waveguide sections still with their jacket in a furnace, which for example has two heated plates at a distance from each other.

According to the prior art the optical waveguide end sections are generally cleaned manually by wiping the optical waveguide end section with the least fluffy cloth possible. The cloth is soaked with a cleaning agent, preferably alcohol. Alcohol has the advantage that it has a very good cleaning action and on evaporation leaves no residues on the cleaned optical waveguide. Manual cleaning with a cloth however has the disadvantage that the cleaning action depends on the skill of the person doing the cleaning. A further disadvantage is that the person doing the cleaning is exposed to toxic vapors when using many cleaning agents.

Another known method for cleaning optical waveguide end sections is cleaning in an ultrasound bath. However this has the disadvantage that alcohol cannot be used because of its combustibility and volatility and it therefore has to be replaced with another less suitable and more expensive cleaning agent.

A device is known from WO 02/44778 A1 for the automatic preparation of optical waveguides for a subsequent splicing procedure. The device has a unit for stripping an optical waveguide, a unit for cleaning the optical waveguide and a separating unit for breaking the optical waveguide, in order to produce an optical waveguide end that is removed from its jacket, cleaned and provided with a flat end surface in a simple fashion.

SUMMARY OF THE INVENTION

The object of the invention is to create a method and a device for cleaning an optical waveguide end section removed from its jacket, ensuring total removal of jacket residues in each instance by means of a cleaning procedure that can be carried out automatically in a simple fashion.

The method-related object is achieved by a method for cleaning an optical waveguide section removed from its jacket with the features of the independent claim 1. The object is based on the knowledge that a combined treatment, in which the optical waveguide end section to be cleaned both sprayed with a cleaning fluid and also subjected to compressed air, allows particularly efficient removal of jacket residues that can be carried out automatically in a simple fashion.

The method according to claim 2 has the advantage that the escape of liquid or evaporated cleaning fluid is prevented and therefore the optimum cleaning fluid for cleaning can be used without any concern about its possible toxicity.

The use of alcohol as a cleaning fluid according to Claim 3 proves particularly advantageous, as alcohol on the one hand has a very good cleaning action and on the other hand it is very economical so that high-quality welded connections can be achieved with low cleaning costs.

The method according to Claim 4, in which the cleaning fluid is applied at an oblique angle to the optical waveguide end section to be cleaned allows particularly efficient removal of adhering jacket residues. An embodiment in which the cleaning fluid is sprayed at an angle of 20° to 50° in relation to the longitudinal axis of the optical waveguide section proves particularly advantageous. Spraying the optical waveguide at an angle of approximately 30° currently appears optimal.

Particularly efficient cleaning is achieved according to Claim 5 by providing a specific minimum quantity of cleaning fluid for each individual cleaning procedure.

Blasting with heated compressed air according to Claim 6 has the advantage that the cleaned optical waveguide end sections, on which liquid cleaning agent residues frequently still remain, can quickly be dried. The heating of the optical waveguide as a result of the use of heated compressed air also has the advantage that internal stresses in the optical waveguide, particularly in the region in proximity to the optical waveguide end section removed from the jacket, are swiftly reduced and it is then possible to align the optical waveguide correctly before a splicing procedure.

The method according to Claim 7, in which the optical waveguide end section is then subjected to cold compressed air has the advantage that both the optical waveguide end section and the treatment cell are correspondingly cooled and it is therefore possible to handle both the optical waveguide and the treatment cell without any problem afterwards. Also the use of cold compressed air ensures that any residues of cleaning fluid present are reliably removed.

The object of the invention relating to the device is achieved by a device for cleaning a section of an optical waveguide removed from its jacket with the features of the independent Claim 8.

The embodiment according to Claim 9 has the advantage that the escape of liquid or gaseous cleaning agent components is reliably prevented, so that the cleaning process is greatly facilitated particularly when using toxic cleaning agents.

The device according to Claim 10 allows simple insertion of the optical waveguide to be cleaned into the treatment cell and simple removal of the cleaned optical waveguide from the treatment cell. An embodiment, in which the treatment cell has both a stationary lower part and a movable upper part, which is for example attached to the lower part in a movable fashion by means of a hinge for example, proves particularly advantageous.

The embodiments according to Claim 11 and Claim 12 have the advantage that the optical waveguide end section to be cleaned can be subjected to compressed air or sprayed with cleaning fluid from different sides.

The device according to Claim 13 allows optimum cleaning of the optical waveguide end section by selectively supplying heated and cold compressed air. The use of heated compressed air allows optimum alignment of the optical waveguide to be spliced, in particular the section of the optical waveguide, which is adjacent to the optical waveguide end section that is removed from its jacket and cleaned, in a subsequent splicing procedure. The use of cold compressed air allows swift cooling of the previously heated optical waveguide and the previously heated treatment cell, so that it is easy to handle both the optical waveguide for a subsequent splicing procedure and the treatment cell for subsequent cleaning procedures.

The embodiment according to Claim 14 has the advantage that a circulation system allows the repeated use of cleaning fluid for a plurality of cleaning procedures. It should be noted in this context that contamination of the cleaning fluid can be eliminated by using an appropriate filter.

The device according to Claim 15 has the advantage that a closed circulation system can be provided in a simple fashion, reliably preventing the escape of possibly toxic cleaning fluid or toxic cleaning vapor.

Further advantages and features of the present invention will emerge from the description which follows of a currently preferred embodiment.

DETAILED DESCRIPTION OF THE INVENTION

Figure 1:
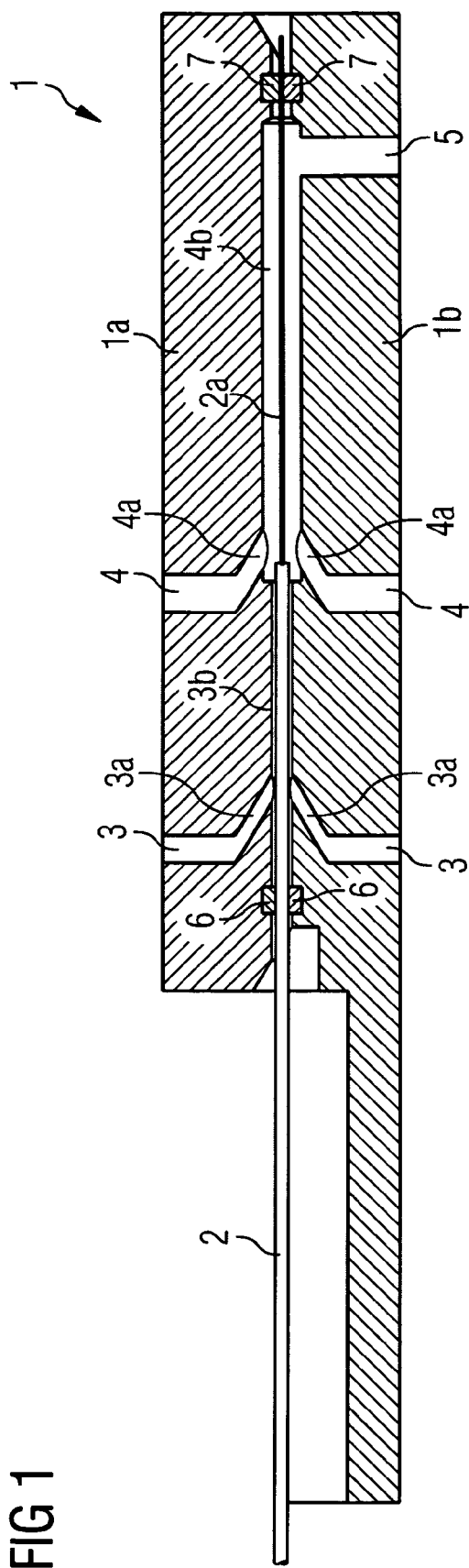
FIG. 1 shows a treatment cell with an optical waveguide inserted, which has an optical waveguide end section removed from its jacket to be cleaned.

The treatment cell 1 illustrated in FIG. 1 is configured in two parts and comprises an upper part 1a and a lower part 1b. The upper part 1a is attached to the lower part 1b in a movable fashion by means of a hinged connection (not shown). When the upper part 1a is opened, an optical waveguide 2 can be inserted into the treatment cell 1 such that when the upper part 1a is subsequently closed, an optical waveguide end section 2a, which has been removed from its jacket, is located in a cleaning chamber 4b. Seals 6 and 7 serve to hold the optical waveguide 2 in a central position in the preferably cylindrically symmetrical treatment cell 1. The seals 6 and 7 also serve to isolate the cleaning chamber 4b from the environment around the treatment cell 1. The treatment cell 1 has a first inlet, having two first inlet openings 3, each of which is connected via a channel 3a to a cylindrical hollow chamber 3b, in which a section of the optical waveguide 2 without its jacket can be held, said section being adjacent to the optical waveguide end section 2a removed from its jacket. The first inlet openings 3 are arranged on opposing sides of the optical waveguide 2 and serve to supply compressed air. The use of compressed air is described in more detail below with reference to FIG. 2.

The treatment cell 1 also has a second inlet for the supply of cleaning fluid, which has two second inlet openings 4. The inlet openings 4 are also arranged on opposing sides of the optical waveguide 2 or the optical waveguide end section 2a. The two second inlet openings 4 are each connected via a channel 4a to the cleaning chamber 4b. The second inlet serves to supply cleaning fluid, said supply also being described in more detail below with reference to FIG. 2.

The treatment cell 1 also has an outlet opening 5, through which both compressed air supplied via the first inlet and cleaning fluid supplied via the second inlet can escape from the cleaning chamber 4b.

Figure 2:
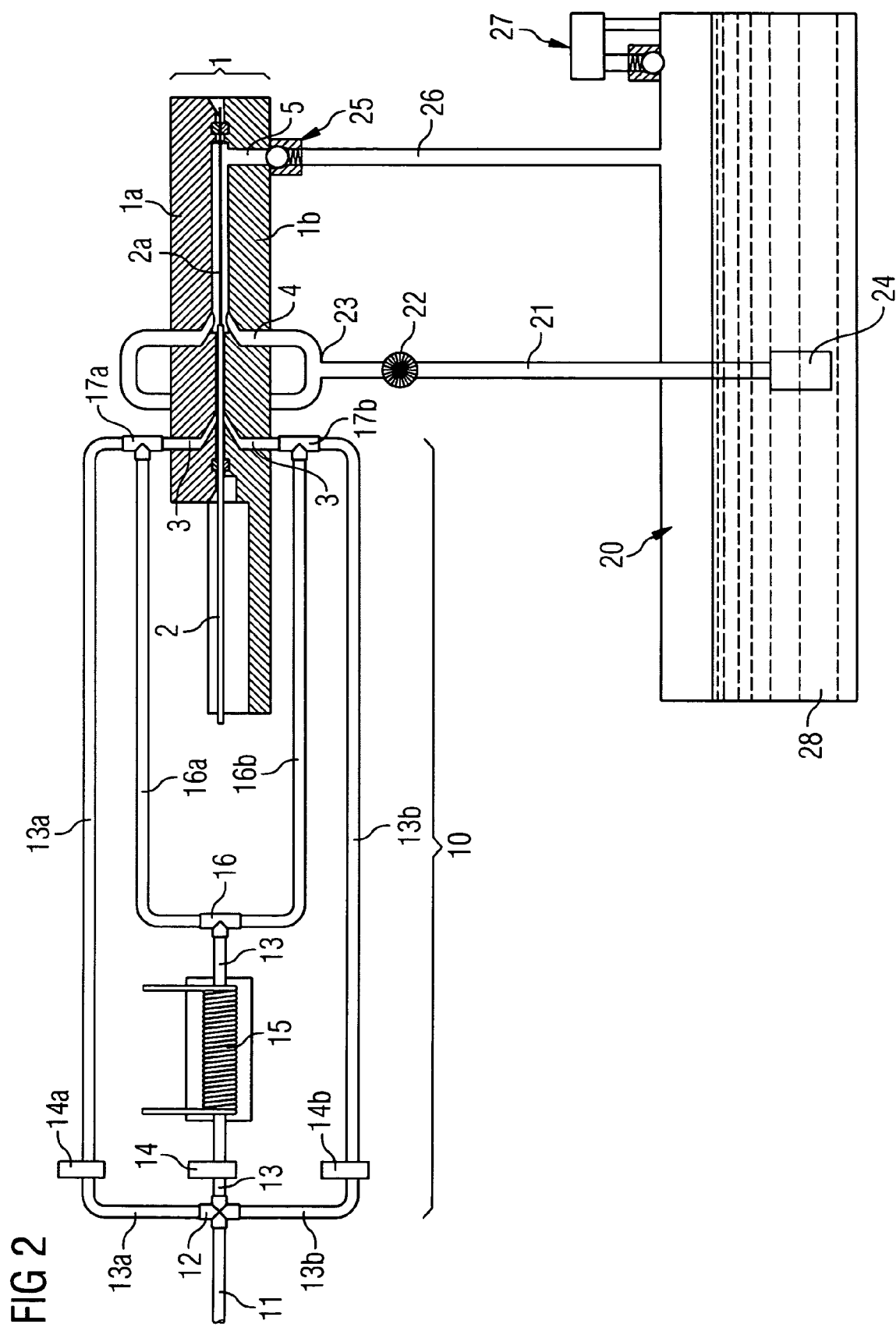
FIG. 2 shows a closed cleaning system with the treatment cell illustrated in FIG. 1.

FIG. 2 shows the treatment cell 1 in a cleaning device, which has a compressed air supply system 10 and a closed circulation system for the cleaning fluid 28.

The compressed air supply system 10 comprises a compressed air line 11, which is linked to a conventional compressor (not shown). The compressed air line 11 opens via a branch 12 into a compressed air line 13, a compressed air line 13a and a compressed air line 13b. A control valve 14, 14a or 14b is provided in each of the three compressed air lines 13, 13a and 13b, by means of which the respective throughflow of compressed air can be controlled individually by corresponding activation unit of the control valves 14, 14a or 14b by a compressed air control unit (not shown). The two compressed air lines 13a and 13b are each connected to a first inlet opening 3 of the treatment cell 1 and serve to supply cold compressed air to the cylindrical hollow chamber 3b. The compressed air line 13 is linked thermally to a heating unit 15, so that the compressed air, which passes downstream from the heating unit 15 via a T-shaped branch 16 into the two compressed air lines 16a and 16b can be heated appropriately. The compressed air line 16a is connected via the T-shaped branch 17a and the compressed air line 16b via the T-shaped branch 17b to one of the two first inlet openings 3. It is therefore possible to set the ratio of the mixture of heated compressed air and cold compressed air as required by corresponding activation of the control valves 14, 14a and 14b.

The cleaning device also comprises a closed cleaning agent circulation system with a container 20, which serves to hold the cleaning fluid 28. The cleaning fluid 28 preferably contains alcohol. The container 20 is connected via a fluid line 21 and a T-shaped branch 23 to the two second inlet openings 4. The fluid line 21 is provided with a pump 22, by means of which the cleaning fluid 28 can be conveyed into the cleaning chamber 2b. A filter 24, located at the end of the fluid line 21 and immersed in the fluid 28, prevents the supply of [cleaning agent contaminated] with dirt particles to the cleaning chamber 4b of the treatment cell 1. The filter 24 in particular filters out residues of optical waveguide jacket, removed during the cleaning procedures carried out previously from optical waveguide end sections 2a.

The outlet 5 of the treatment cell 1 is provided with an outlet valve 25, which only allows the discharge of cleaning fluid 28 or compressed air from a defined minimum pressure in the cleaning chamber 4b. The outlet valve 25 is connected via an outlet line 26 to the container 20 and together with the fluid line 21 thus forms a closed fluid circulation system, which allows the recycling of cleaning fluid 28 for a plurality of cleaning procedures. The compressed air leaving the treatment cell 1 via the outlet line 26 is also supplied to the container 20. The container 20 is however provided with a vapor separator 27, so that the compressed air can escape from the container 20 without possibly toxic vapors also leaving at the same time.

Optimum preparation of an optical waveguide 2 for a subsequent splicing procedure can be achieved by spraying the cleaning fluid 28 at an oblique angle of preferably 30° in relation to the longitudinal axis of the optical waveguide 2 onto the optical waveguide end section 2a. Optimum preparation also requires that after the optical waveguide end section 2a has been sprayed, a rather larger area of the optical waveguide 2, comprising both the optical waveguide end section 2a and an adjacent area of the optical waveguide 2 with its jacket, should be subjected first to warm and then cold compressed air. The use of warm compressed air results both in drying of the optical waveguide end section 2a and also heating of the jacket of the optical waveguide 2 in the cylindrical hollow chamber 3b, so that internal stresses in the jacket of the optical waveguide 2 can be reduced in a simple fashion. The subsequent use of cold compressed air causes cooling of the optical waveguide and in some instances the blasting out of any residues of liquid or gaseous cleaning agents present.

It should be noted in this context that while the cleaning fluid 28 is being supplied, the use of compressed air is interrupted by corresponding activation of the control valves 14, 14a and 14b and vice versa when compressed air is being applied, the supply of cleaning agent is interrupted by disconnecting the pump 22. With such a mode of operation, operators never come into contact with the cleaning fluid 28 or corresponding vapors of the cleaning fluid 28, even when inserting or removing the optical waveguide 2 into or from the treatment cell 1.

To Summarize:

The invention creates a method for cleaning a section 2a of an optical waveguide 2 removed from its jacket, in which the optical waveguide section 2a is inserted into a treatment cell 1, sprayed with a cleaning fluid 28, blasted with compressed air and removed from the treatment cell 1. The method according to the invention allows cleaning in precisely defined conditions, which can be carried out in a simple fashion in a corresponding device. The blasting of the optical waveguide section 2a with compressed air preferably first includes the use of heated compressed air and then the use of cold compressed air. The invention also creates a corresponding cleaning device with a treatment cell 1 for holding the optical waveguide section 2a, said treatment cell 1 having a first inlet 3 for the supply of compressed air, a second inlet 4 for the supply of cleaning fluid 28 and an outlet 5 for the removal of compressed air and cleaning fluid 28. The cleaning device is preferably configured as a system that is isolated from the environment, so that the escape of possibly toxic liquid or vaporous cleaning agents and therefore any danger to the health of an operator is reliably excluded.

What is claimed is:

1. A method for cleaning a section of an optical waveguide removed from its jacket, comprising the steps of:
    inserting the optical waveguide section into a treatment cell,
    spraying the inserted optical waveguide section with a cleaning fluid,
    blasting the sprayed optical waveguide section with heated compressed air, the heated compressed air being at a higher pressure than pressure in the treatment cell, and
    removing the blasted optical waveguide section from the treatment cell.

2. The method according to claim 1, wherein the treatment cell is a closed treatment cell.

3. The method according to claim 1, wherein the cleaning fluid is alcohol.

4. The method according to claim 1, wherein the step of spraying further comprises the step of spraying the cleaning fluid at an oblique angle relative to a longitudinal axis of the optical waveguide section.

5. The method according to claim 4, wherein the angle is 10° to 60° degrees.

6. The method according to claim 1, wherein the step of spraying further comprises the step of spraying at least 3 cc of cleaning fluid.

7. The method according to claim 1, further comprising the step of blasting the optical waveguide section with cold compressed air after the step of blasting the optical waveguide section with heated compressed air.

8. The method according to claim 1, wherein the step of spraying further comprises the step of spraying at least 6 cc of cleaning fluid.

9. A device for cleaning a section of an optical waveguide removed from its jacket, comprising:
    a hot air compressed air supply arranged to supply heated compressed air; and
    a treatment cell comprising holding means for holding the optical waveguide section, a first inlet coupled to the hot air compressed air supply to supply heated compressed air, which is at a higher pressure than the pressure in the treatment cell, a second inlet arranged to supply cleaning fluid, and an outlet arranged to remove compressed air and cleaning fluid.

10. The device according to claim 9, wherein the treatment cell is isolated from the environment.

11. The device according to claim 9, wherein the treatment cell comprises at least two parts.

12. The device according to claim 9, wherein the first inlet comprises at least two first inlet openings arranged around a longitudinal axis of the optical waveguide section.

13. The device according to claim 9, wherein the second inlet comprises at least two second inlet openings arranged around a longitudinal axis of the optical waveguide section.

14. The device according to claim 9, further comprising:
    a cold air compressed air supply arranged to supply cold compressed air,
    the hot air and cold air compressed air supplies each being linked to the first inlet, and
    a compressed air control unit arranged to control a ratio of a mixture of heated compressed air and cold compressed air.

15. The device according to claim 9, further comprising a collection container arranged to hold cleaning fluid, the container being further linked to the second inlet and the outlet.

16. The device according to claim 15, wherein the collection container is isolated from the environment and comprises a vapor separator.

* * * * *